(12) United States Patent
McCullagh et al.

(10) Patent No.: US 8,285,996 B2
(45) Date of Patent: Oct. 9, 2012

(54) VERIFICATION OF IDENTITY BASED SIGNATURES

(75) Inventors: Noel McCullagh, Dublin (IE); Michael Scott, Dublin (IE); Neil Costigan, Carlow (IE)

(73) Assignee: Dublin City University, Dublin (IE)

( * ) Notice: Subject to any disclaimer, the term of this patent is extended or adjusted under 35 U.S.C. 154(b) by 1750 days.

(21) Appl. No.: 11/528,630

(22) Filed: Sep. 28, 2006

(65) Prior Publication Data
US 2007/0028114 A1 Feb. 1, 2007

Related U.S. Application Data

(63) Continuation of application No. PCT/IE2005/000034, filed on Mar. 30, 2005.

(51) Int. Cl.
*H04L 29/06* (2006.01)
(52) U.S. Cl. ........ 713/176; 713/155; 713/156; 713/157; 713/158; 713/177; 713/180; 380/277; 380/278; 380/279; 380/280; 380/281; 380/282
(58) Field of Classification Search .......... 713/176, 713/155–158, 177, 180; 380/277–282, 44–47
See application file for complete search history.

(56) References Cited

U.S. PATENT DOCUMENTS

| | | | |
|---|---|---|---|
| 5,347,581 A * | 9/1994 | Naccache et al. | 380/30 |
| 6,212,637 B1 * | 4/2001 | Ohta et al. | 713/176 |
| 6,553,493 B1 * | 4/2003 | Okumura et al. | 713/170 |
| 7,533,270 B2 * | 5/2009 | Gentry | 713/180 |
| 7,890,763 B1 * | 2/2011 | Law et al. | 713/176 |

FOREIGN PATENT DOCUMENTS

| WO | WO03/017559 | 2/2003 |
|---|---|---|
| WO | WO03/090429 | 10/2003 |

OTHER PUBLICATIONS

Boneh et al, Lecture Notes in Computer Science, pp. 416-432, May 4, 2003, XP002302960, Aggregate and verifiably-encrypted . . . .

* cited by examiner

*Primary Examiner* — Beemnet Dada
*Assistant Examiner* — Randal Moran
(74) *Attorney, Agent, or Firm* — Jacobson Holman PLLC

(57) ABSTRACT

A database management system (1) comprises up to fifty or more workstations (2), each for a user. The environment may, for example, be a hospital and the system manages medical records in a secure manner. Each user has a private key issued by a KGC (5). A database controller (3) updates a secure database (3) with data and associated signatures generated by the user workstations (2). Thus every record of the secure database (3) has a signature to provide full traceability and non-repudiation of data edits/updates. It is important for the system (1) that the signatures are verified on a regular basis, say every hour. Such a task would be extremely processor-intensive if the database (3) is large. However this is performed by a verification processor (4) of the system (1) in a much shorter time than heretofore, $t_1 + n(\&Dgr;)$, where $t_1$ is the time for one verification, n is the number of signatures, and $\&Dgr;$ is a time value which is a very small proportion of $t_1$ (less than 1%).

21 Claims, 1 Drawing Sheet

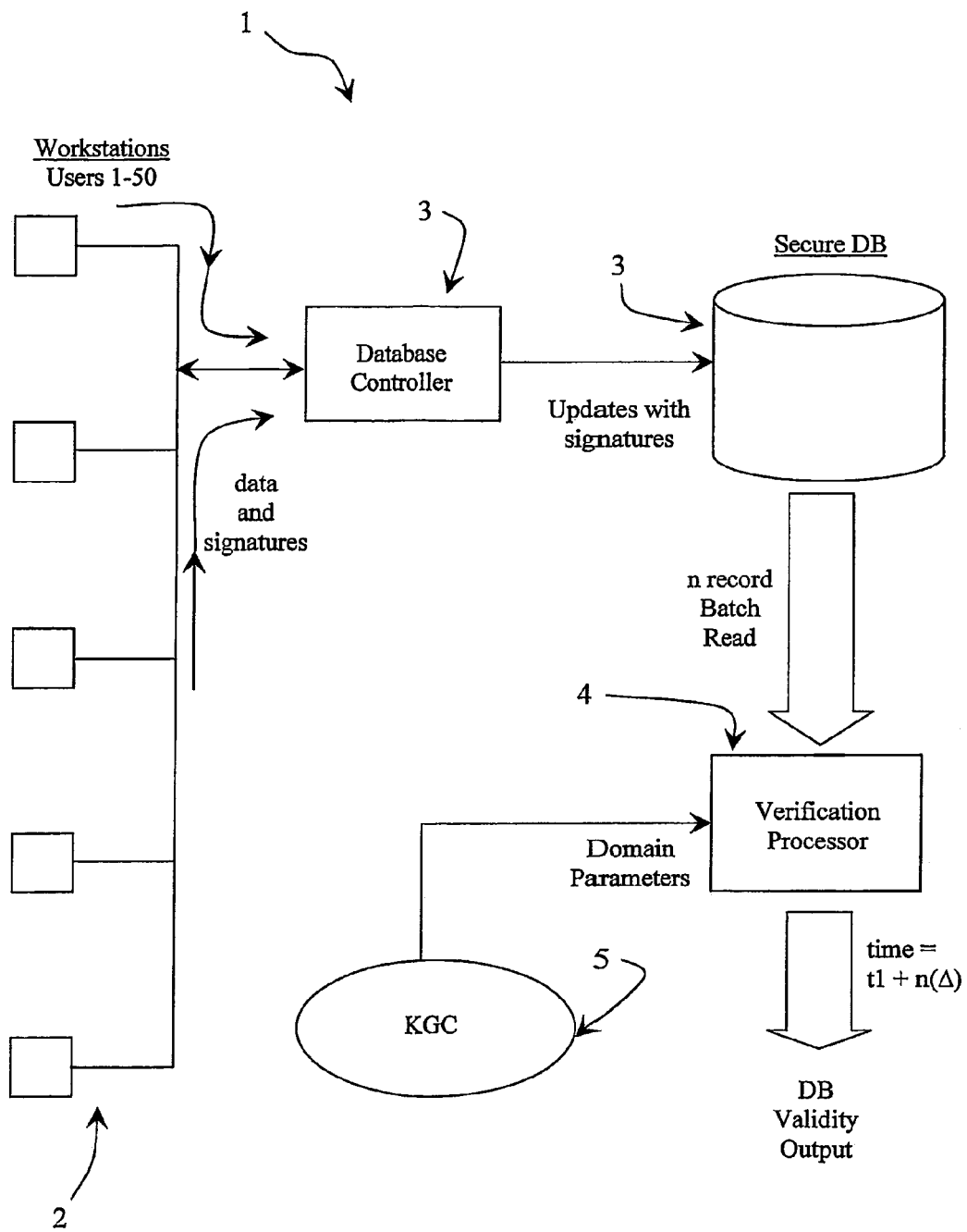

VERIFICATION OF IDENTITY BASED SIGNATURES

This is a continuation of PCT/IE2005/000034 filed 30 Mar. 2005 and published in English.

FIELD OF THE INVENTION

The invention relates to verification of identity-based cryptographic (iBC) signatures.

PRIOR ART DISCUSSION

As is well known, traditional public key cryptography involves a sender ("Alice") using the public key of the receiver ("Bob") to encrypt a message destined for Bob. Bob's system decrypts the message using his private key. When Bob wishes to digitally sign a message he uses his private key to generate the signature. If the message with the digital signature is transmitted to Alice, her system can verify by using Bob's public key that the signature originated with Bob's system.

The task of obtaining a key pair has been most often undertaken by a system (say, Bob's) generating the key pair by executing software developed for the purpose. However, before it can be used for cryptography the public key must be approved. This involves a very tedious and time-consuming process akin to obtaining a physical passport. The reason for this is that the public key must with certainty be associated only with Bob. This is one of the reasons why public key cryptography has not as yet become as extensively used as some would have expected.

A long standing solution to this problem was thought to be identity based encryption, for which a practical implementation emerged in 2001. In IBE, a key generation centre (KGC) issues to Bob a key pair, in which the public key is generated from a common and fixed (for the KGC) set of domain parameters and a unique identity for Bob such as his email address or telephone number. When Alice wishes to transmit an encrypted message to Bob, her system accesses Bob's KGC and retrieves the domain parameters. Her system uses this and Bob's identity to determine Bob's public key, which is then used to encrypt the message, or to verify a signature from Bob. Thus, the KGC issues key pairs to users in a much more straight-forward manner and also performs the function of allowing any interested party to determine a person's public key much more easily.

The processor task of verifying an identity based signature is very slow as it is computationally expensive. Thus, at present there would be an unacceptable delay in verifying signatures on many mobile devices. Also, there would be a slow response time for a database management system to verify all records of a secure database such as a medical records database. This may, for example, involve verifying over 10,000 signatures. Also, a corporate server would have a large processor overhead imposed for verification of many signatures with a high volume of incoming email traffic.

The invention is therefore directed towards achieving verification of multiple signatures with fewer processor cycles.

SUMMARY OF THE INVENTION

According to the invention, there is provided a cryptographic method comprising the steps of:
at least one signing processor generating a plurality of digital signatures,
wherein said digital signatures are generated by retrieving a private key sA from a key generation centre in which there is a constant relationship between the private keys sA and their associated public keys A, and in which a public parameter Q common to all signatures is used together with the private key to generate each signature; and
a verification processor verifying all of the signatures together in a batch process by executing functions on elements of the signatures.

In one embodiment, for each element, the verification processor combines values of that element for all of the signatures to provide an aggregate element, and then performs a verification function using the aggregate elements.

In another embodiment, the element values are combined by summing.

In one embodiment, said verification function is a bilinear map.

In one embodiment, the bilinear map maps between aggregate elements of one or two groups to an element in one group.

In one embodiment, the public parameter Q is multiplied by a randomly generated multiplier x to provide a secret component xQ of an element of each signature.

In a further embodiment, the random multiplier x is randomly generated for each signature.

In one embodiment, during signature generation the public parameter P is used in one element and the public component Q is used in another element.

In another embodiment, the public parameter Q is generated so that it is known, but that its discrete log with respect to any other point is unknown.

In one embodiment, Q is generated by the key generation centre.

In a further embodiment, the secret component xQ is added to an element which is the hash of the message and signature element R (h=hash(m,R)), multiplied by the private key (sA), the secret component xQ and the private key both being private separately but an element S (hsA+xQ) which is a sum of them is public.

In one embodiment, the multiplier x is applied to a public domain parameter P retrieved from the key generation centre to provide another component R=xP.

In one embodiment, a group for a pair comprising the element S and a domain parameter P is mapped by the bilinear map to one group, and the elements S and P may be in separate groups or may be in the same group.

In one embodiment, a final pairing comprises a summation of element values where each element is:
a hash of a message and corresponding signature element R multiplied by the public keys, hiAi; and
a public domain parameter sP.

In one embodiment, the other pairing comprises a summation of elements of:
the signature component R=xP; and
the public parameter Q.

In a further embodiment, the verification processor retrieves the signatures from a secure database, and performs the verification on the signatures for database verification.

In one embodiment, the verification processor retrieves the signatures from a messaging system.

In another aspect, the invention provides a cryptographic system comprising:
at least one signing processor for generating a plurality of digital signatures in any method as defined above; and
a verification system comprising:
a first interface to receive the digital signatures, a second interface to retrieve cryptography data from a key generation centre, and a processor for performing batch verification of all of the signatures together according to any method as defined above.

In one embodiment, the signing processor comprises means for retrieving public domain parameters P and sP from the key generation centre.

In another embodiment, the signing processor comprises means for retrieving the public parameter Q from the key generation centre.

In one embodiment, the signing processor comprises means for retrieving from a key generation centre instructions for deriving the public parameter Q and for using said instructions to derive Q.

In another aspect, the invention provides a database management system comprising:

- a plurality of workstations each for generating a data record together with a digital signature of a registered user who is responsible, said digital signatures being generated according to any method as defined above;
- a database controller for writing data record updates to a database, said records comprising update data together with a digital signature for the person responsible;
- a signature verification processor for batch verifying signatures in the database in any method as defined above.

DETAILED DESCRIPTION OF THE INVENTION

Brief Description of the Drawings

The invention will be more clearly understood from the following description of some embodiments thereof, given by way of example only with reference to the accompanying drawings in which: —

FIG. 1 is a block diagram of a database management system performing signature verification with a method of the invention.

DESCRIPTION OF THE EMBODIMENTS

Referring to FIG. 1 a database management system 1 comprises up to fifty or more workstations 2, each for a user. The environment may, for example, be a hospital and the system manages medical records in a secure manner. Each user has a private key issued by a KGC 5. A database controller 3 updates a secure database 3 with data and associated signatures generated by the user workstations 2. Thus every record of the secure database 3 has a signature to provide full traceability and non-repudiation of data edits/updates. It is important for the system 1 that the signatures are verified on a regular basis, say every hour. Such a task would be extremely processor-intensive if the database 3 is large. However this is performed by a verification processor 4 of the system 1 in a much shorter time than heretofore, $t_1+n(\Delta)$, where $t_1$ is the time for one verification, n is the number of signatures, and $\Delta$ is a time value which is a very small proportion of $t_1$ (less than 1%).

In more detail, consider:

Alice (one of the users of workstations 2) has a private key sA and a public key A.

The KGC 5 provides domain parameters P and sP.

The workstation 2 generates Alice's signature as:

(S,R,m), where

R=xP
S=hsA+xQ where hsA is Alice's private key multiplied by a hash of the message m and the signature element R (h=hash (m, R)), x is a random multiplier of Q and P, and Q is a known fixed point such as a hash of a constant string, which is public.

R is xP where P is the domain parameter issued by the KGC 5, and m is the message (data).

Thus, in generation of a signature every workstation 2 incorporates a point xQ on the same elliptic curve as used by the KGC. The point Q may be the hash of a constant public string, or may be generated and distributed by the KGC.

To verify this signature, the processor 4 performs:

$$e(hsA+xQ,P)=e(hA,sP)*e(Q,R),$$

in which from left to right:

sA and xQ are private, but (hsA+xQ) in combination is public as it is part of the signature, P is public, h is public, A is public, sP is public, Q is public, and xP is public.

The processor 5 can perform two verifications simultaneously (for users A & B) as follows with aggregation of elements:

$$e(S_A+S_B,P)=e(h_AA+h_BB,sP)*e(R_A+R_B,Q)$$

This can be generalized for n signatures to:

$$e\left(\sum_{i=1}^{n} Si, P\right) \stackrel{?}{=} e\left(\sum_{i=1}^{n} (hiAi), sP\right) * e\left(\sum_{i=1}^{n} Ri, Q\right)$$

By implementing this function the processor 4 of FIG. 1 can simultaneously verify all signatures in a batch. It will be noted that the processing involves predominantly hashing and summation operations to aggregate the element values, which are not processor-intensive.

The ability to achieve such fast batch verification is achieved because the signature incorporates Q as a public parameter which is common to all signatures. It is also achieved because there is a constant relationship between all public and private keys when using the Boneh and Franklin IBE key pair.

The following demonstrates the improvement in processing speed achieved. Pairings take approximately 3992 field multiplications, point doubling takes 8 field multiplications, point addition takes 11 field multiplications, point scalar multiplication takes approximately 2160 field multiplications, pairing exponentiation takes approximately 480 field multiplications. Thus, because the processor only needs to perform three pairings (3992 multiplications) instead of 3×n pairings for verification of n signatures there is a considerable processor activity reduction. The additional pairings are replaced by point additions, which take only 11 field multiplications.

In more detail, the process makes use of the fact that in a certain class of identity based cryptography (as devised by Boneh and Franklin) there is a constant relationship between public and private keys. This relationship is that the private key is calculated as sA for an identity A and a fixed value s known only to the KGC. The verification process makes use of this constant relationship to dramatically reduce the computation involved in the batch verification of certain identity based signature schemes.

The signature verification makes use of three groups over which the discrete logarithm problem is hard, we call these $G_1$, $G_2$ and $G_3$. It uses a bilinear map of the form e: $G_1 \times G_2 \rightarrow G_3$. We describe the verification using a bilinear map of the form $e(P,Q)=e(Q,P)$, but the scheme is not restricted to this case. An implementation of the system when $e(P,Q)$ is not equal to $e(Q,P)$ is clear to an expert in the field. They may all be groups of order p, but they need not be. We denote the set of invertable elements modulo p as $Zp^*$. The signature verification uses two hash functions $H_{id}:\{0,1\}^* \rightarrow G_1$ and $H_m: G_1 \times \{0,1\}^* \rightarrow Zp^*$ and the same setup algorithm as the well known Boneh and Franklin IBE scheme. $H_{id}:\{0,1\}^* \rightarrow G_1$ is the Boneh and Franklin hash function for mapping identities (online identifiers) to elements of the group $G_1$ (points on the elliptic curve). It also makes use of an element in $G_1$, Q for which the discrete logarithm between this point and any other point in the system is unknown. In one embodiment Q is generated by hashing a fixed publicly known string using $H_{id}$. Alternatively, Q may be generated and distributed by the KGC.

Such a point is not used in other identity based signature mechanisms that the inventors are aware of and in fact makes this signature slightly slower than existing mechanisms for a single signature verification. However inclusion of this point allows signatures to be batch verified with improved processor efficiency and remain secure.

The KGC issues two points, P and sP in $G_2$. $G_1$ and $G_2$ may be the same group, but not necessarily.

To sign a message, Alice generates a random value x in $Zp^*$. Alice, using her private key (which we denote sA), the message (which we denote m), and the $H_m$ function does the following.

$R=xP$ $h=H_m(m,R)$ $S=hsA+xQ$

The signature on the message m is (R, S).

The verifier first calculates h using R (the first component of the signature) and m (the message). The verifier also calculates Alice's public key:

$A=H_{id}$(alice@company.com) (this value may be precomputed)

$h=H_m(m,R)$

The signature is verified and accepted if the following equation holds:

$e(S,P)=e(hA,sP)*e(Q,R)$

To batch verify this signature we consider two signatures that are generated entirely separately by Alice and Bob. Alice and Bob do not collude in any way in the signature creation stage. Consider Alice and Bob, whose identities map to the points A and B respectively.

Alice generates a random $x_A$ in $Zp^*$, and creates the signature as follows $R_A=x_A P$ $h_A=H_m(m_A,R_A)$ $S_A=h_A sA+x_A Q$ Bob generates a random value $x_B$ and calculates the following signature $R_B=x_B P$ $h_B=H_m(m_B,R_B)$ $S_B=h_B sB+x_B Q$ Now consider the individual verification of these signatures.

For Alice's signature we have $A=H_{id}$(alice@company.com) (this value may be precomputed)

$h_A=H_m(m_A,R_A)$ $e(S_A,P)=e(h_A A,sP)*e(R_A,Q)$

For Bob's signature we have $B=H_{id}$(bob@company.com) (this value may be precomputed)

$h_B=H_m(m_B,R_B)$ $e(S_B,P)=e(h_B B,sP)*e(R_B,Q)$

This takes six pairing operations (without pre-computation) to verify two signatures. However, in the invention there is much more efficient verification of both of these signatures simultaneously. This is done as follows:

$h_A=H_m(m_A,R_A)$ $h_B=H_m(m_B,R_B)$ $e(S_A S_b,P)=e(h_A A+h_B B,sP)*e(R_A+R_B,Q)$

This equation will hold only if both of the individual signatures are valid. Any arbitrary number of signatures can be verified in this manner. This takes only three pairings (without pre-computation), to verify both signatures.

We use $A_i$ to denote the public key of signer i. We use $m_i$ to denote message i, and signature i is denoted as $(R_i,S_i)$. Generically these signatures are verified as:

for all $i$ calculate $h_i=H_m(m_i R_i)$

Now check if the following equality holds:

For all $i$, compute $S^*=\Sigma S_i$

For all $i$, compute $R^*=\Sigma R_i$

For all $i$, compute $A^*=\Sigma(h_i A_i)$ now check that the following equality holds, if it does accept all signatures $e(S^*,P)=e(A^*,sP)*e(R^*,Q)$ An advantageous aspect is the summation of the elements in $G_1$ and $G_2$, and the inclusion of a point Q (for which the discrete log with respect to any other point is unknown). This allows m signatures by n different signers to be verified using only three pairing computations (or two with pre-computation). There are further improvements when multiple signatures from the same signer are present, and if $e(A_i,sP)$ is stored for any or all of the signers. These improvements will be clear to persons skilled in the field.

In summary, therefore the invention provides a cryptographic method whereby a recipient of several signed identity based messages adds elements of different/distinct signatures together before computing two or three bilinear maps on the sum of these signature elements in order to reduce the number of bilinear map operations needed to verify all of the signatures. By signature elements we mean the signature values R and S.

Another aspect is that there is a constant relationship between A (the public key—derived from the signer's identity), and the private key sA, where s is, or is derived from, the Key Generation Centre's (KGC)'s secret value. The KGC calculates and distributes private keys only to users to which they are assigned. Such users then have the ability to sign messages.

The public keys of all users are publicly available (or are easy to calculate from the user's online identifier—their email address etc) and the private key for each user is a secret known only to the user to which it is assigned and the KGC.

It will also be appreciated that the KGC generates and distributes the public domain parameters, either via the Internet, utilising search engines, or any other suitable method. The public domain parameters are made available to all users of the system By users we mean senders and receivers of signed messages.

Also, users have read-only access to the public domain parameters, as issued by the KGC.

It will be appreciated that the authenticity and accuracy of the public domain parameters are assured. This can be achieved by traditional e-commerce-commerce means or any other method deemed acceptable to the KGC.

The invention is not limited to the embodiments described but may be varied in construction and detail.

The invention claimed is:

1. A cryptographic method comprising the steps of:
a plurality of signing processor devices independently generating a plurality of identity-based digital signatures, using domain parameters P and private keys sA retrieved from a key generation centre, wherein there is a constant relationship between the private keys sA and their associated public keys A, and in which a public parameter Q common to all signatures is used together with the private key to generate each signature; and
a verification processor device verifying all of the identity-based digital signatures together in a batch process by executing functions on elements of the signatures, wherein for each element the verification processor device combines values of that element for all of the signatures to provide an aggregate element, and then performs a verification function using the aggregate elements, wherein said verification function is a bilinear map which maps between aggregate elements of one or two groups to an element in one group.

2. The cryptographic method as claimed in claim 1, wherein the element values are combined by summing.

3. The cryptographic method as claimed in claim 1, wherein the public parameter Q is multiplied by a randomly generated multiplier x to provide a secret component xQ of an element of each signature.

4. The cryptographic method as claimed in claim 1, wherein the public parameter Q is multiplied by a randomly generated multiplier x to provide a secret component xQ of an element of each signature; and wherein the random multiplier x is randomly generated for each signature.

5. The cryptographic method as claimed in claim 1, wherein the public parameter Q is multiplied by a randomly generated multiplier x to provide a secret component xQ of an element of each signature; and wherein during signature generation the public parameter P is used in one element and the public component Q is used in another element.

6. The cryptographic method as claimed in claim 1, wherein the public parameter Q is multiplied by a randomly generated multiplier x to provide a secret component xQ of an element of each signature; and wherein the public parameter Q is generated so that it is known, but that its discrete log with respect to any other point is unknown.

7. The cryptographic method as claimed in claim 1, wherein the public parameter Q is multiplied by a randomly generated multiplier x to provide a secret component xQ of an element of each signature; and wherein Q is generated by the key generation centre.

8. The cryptographic method as claimed in claim 1, wherein the public parameter Q is multiplied by a randomly generated multiplier x to provide a secret component xQ of an element of each signature; and wherein the secret component xQ is added to an element which is the hash of the message and signature element R (h=hash(m,R)), multiplied by the private key (sA), the secret component xQ and the private key both being private separately but an element S (hsA+xQ) which is a sum of them is public.

9. The cryptographic method as claimed in claim 1, wherein the public parameter Q is multiplied by a randomly generated multiplier x to provide a secret component xQ of an element of each signature; and wherein the multiplier x is applied to a public domain parameter P retrieved from the key generation centre to provide another component R=xP.

10. The cryptographic method as claimed in claim 1, wherein the public parameter Q is multiplied by a randomly generated multiplier x to provide a secret component xQ of an element of each signature; and wherein the secret component xQ is added to an element which is the hash of the message and signature element R (h=hash(m,R)), multiplied by the private key (sA), the secret component xQ and the private key both being private separately but an element S (hsA+xQ) which is a sum of them is public; and wherein a group for a pair comprising the element S and a domain parameter P is mapped by the bilinear map to one group, and the elements S and P may be in separate groups or may be in the same group.

11. The cryptographic method as claimed in claim 10, wherein a final pairing comprises a summation of element values where each element is:
a hash of a message and corresponding signature element R multiplied by the public keys, hiAi; and
a public domain parameter sP.

12. The cryptographic method as claimed in claim 11, wherein the other pairing comprises a summation of elements of:
the signature component R=xP of claim 10; and
the public parameter Q.

13. The cryptographic method as claimed in claim 1, wherein the verification processor device retrieves the signatures from a secure database, and performs the verification on the signatures for database verification.

14. The cryptographic method as claimed in claim 1, wherein the verification processor device retrieves the signatures from a messaging system.

15. A non-transitory computer readable medium comprising software code for implementing a cryptographic process when executing on a digital computer comprising:
a plurality of signing processor devices independently generating a plurality of identity-based digital signatures, using domain parameters P and private keys sA retrieved from a key generation centre, wherein there is a constant relationship between the private keys sA and their associated public keys A, and in which a public parameter Q common to all signatures is used together with the private key to generate each signature; and
a verification processor device verifying all of the identity-based digital signatures together in a batch process by executing functions on elements of the signatures, wherein for each element the verification processor device combines values of that element for all of the signatures to provide an aggregate element, and then performs a verification function using the aggregate elements, wherein said verification function is a bilinear map which maps between aggregate elements of one or two groups to an element in one group.

16. A cryptographic system comprising:
at least one signing processor device for generating a plurality of digital signatures comprising: a plurality of signing processor devices independently generating a plurality of identity-based digital signatures, using domain parameters P and private keys sA retrieved from a key generation centre, wherein there is a constant relationship between the private keys sA and their associated public keys A, and in which a public parameter Q common to all signatures is used together with the private key to generate each signature; and
a verification system comprising:
a first interface to receive the digital signatures, a second interface to retrieve cryptography data from a key generation centre, and a processor device for performing batch verification of all of the signatures together comprising: a verification processor device verifying all of the identity-based digital signatures together in a batch process by executing functions on elements of the signatures, wherein for each element the verification processor device combines values of that element for all of the signatures to provide an aggregate element, and then performs a verification function using the aggregate elements, wherein said verification function is a bilinear map which maps between aggregate elements of one or two groups to an element in one group.

17. The cryptography system as claimed in claim 16, wherein the signing processor comprises means for retrieving public domain parameters P and sP from the key generation centre.

18. The cryptography system as claimed in claim 16, wherein the signing processor comprises means for retrieving the public parameter Q from the key generation centre.

19. The cryptography system as claimed in claim 16, wherein the signing processor comprises means for retrieving from a key generation centre instructions for deriving the public parameter Q and for using said instructions to derive Q.

20. A database management system comprising:
a plurality of workstations each for generating a data record together with a digital signature of a registered user who is responsible, said digital signatures being generated according to a plurality of signing processor devices independently generating a plurality of identity-based digital signatures, using domain parameters P and private keys sA retrieved from a key generation centre, wherein there is a constant relationship between the private keys sA and their associated public keys A, and in which a public parameter Q common to all signatures is used together with the private key to generate each signature; and;
a database controller for writing data record updates to a database, said records comprising update data together with a digital signature for the person responsible;
a signature verification processor device verifying all of the identity-based digital signatures together in a batch process by executing functions on elements of the signatures, wherein for each element the verification processor device combines values of that element for all of the signatures to provide an aggregate element, and then performs a verification function using the aggregate elements, wherein said verification function is a bilinear map which maps between aggregate elements of one or two groups to an element in one group.

21. A cryptographic method comprising the steps of:
a plurality of signing processors independently generating a plurality of identity-based digital signatures, using domain parameters P and private keys sA retrieved from a key generation centre;
wherein there is a constant relationship between the private keys sA and their associated public keys A, and in which a public parameter Q common to all signatures is used together with the private key to generate each signature;
a verification processor device verifying all of the identity-based digital signatures together in a batch process by executing functions on elements of the signatures;
wherein for each element the verification processor device combines values of that element for all of the signatures to provide an aggregate element, and then performs a verification function using the aggregate elements;
wherein said verification function is bilinear map which maps between aggregate elements of one or two groups to an element in one group, wherein the public parameter Q is multiplied by a randomly generated multiplier x to provide a secret component xQ of an element of each signature;
wherein during signature generation the public parameter P is used in one element and the public component Q is used in another element.

* * * * *